Patented Oct. 31, 1939

2,178,167

UNITED STATES PATENT OFFICE 2,178,167

PROCESS FOR PRODUCING PHOTOGRAPHIC DYESTUFF IMAGES

Bela Gaspar, Brussels-Forest, Belgium

No Drawing. Application October 17, 1938, Serial No. 235,527. In Great Britain October 18, 1937

8 Claims. (Cl. 95—6)

The present invention relates to a process of dyeing photographic pictures by azo-dyes and involves the synthesis of the azo-dye within the exposed photographic colloid layer. The synthesis of an azo-dye—as is well known—comprises chemical reaction between a diazo-compound, i. e. a diazotized aromatic amino-compound and a so-called azo-coupler which may be a phenol naphthol, aromatic amino-compound, a pyrazolone or the like. It is known from my prior patents that azo-dyes can be synthesized within the exposed photographic layer from azo-dye components which are added to the emulsion prior to the exposure. The azo-dye components, especially amines and phenols, are sometimes altered during the storage of the light sensitive material. According to the present invention an aromatic nitro-compound or nitroso compound is incorporated in the light sensitive emulsion and from the nitro- or nitroso compound I obtain amino-compound after the exposure. From the amino-compounds thus obtained, azo dyestuffs can be produced by various processes to form a uniform coloring of the silver image or to form a dyestuff image.

*Example 1.*—Di-(nitrobenzoylamino)-stilbene-disulphonic acid is incorporated into a photographic layer in an amount of ½ to 1 gram per sq. meter. The layer is exposed, developed and fixed in the usual manner and then treated with a reducing agent, such as, for instance, a sodium hydrosulphite solution of 2% strength, which is capable of reducing the nitro-compound to the corresponding amino-compound. The layer is washed and treated with a sodium nitrite solution, so that the amino-compound will be diazotised. The layer is treated, thereafter, with an alkaline solution of β-naphthol and a red dyestuff is obtained. From the photographic layer containing a silver image and a red dyestuff uniformly distributed within the layer, a dyestuff image may be obtained by treating with a selectively dye-destroying agent, such as, for instance, an acid thiocarbamide solution. A great number of other dye-destroying solutions have been described in my prior U. S. Patent No. 2,020,775 of November 12, 1935. If, after the local destruction of the dyestuff any silver should still be present, this silver may be removed in the usual manner. By the treatment described a red dyestuff image will be obtained which is a reversed image as compared with the original silver image.

Whereas in the preceding example the nitro-compound has been reduced to the amino-compound in a uniform manner such reduction may also be performed locally in an image-like fashion. Thus, for instance, the nitro-compound or nitroso-compound can be locally reduced to amino-compounds at the places where silver is present and in direct proportion to the density of the silver image. The amino-compound may be transformed thereafter into a dyestuff by diazotising and coupling or otherwise, for example by coupling with diazo-compounds.

The most suitable method of transforming the nitro-compound locally into an amino-compound consists in treating the silver image with solutions which locally reduce the nitro-compound to an amino-compound where silver is present. Generally speaking, the reagents used for the local reduction of dyestuffs in the process described in my aforementioned U. S. Patent No. 2,020,775 are suitable also for the reduction of nitro-compounds to amino-compounds. The treatment with a thiocarbamide solution may be given as an example. It may be mentioned, however, that other reagents such as, for instance, acids like hydrobromic or hydrochloric acid, are also suitable means for reducing a nitro-compound or nitroso-compound to an amino-compound at the places where silver is present. This reduction may be accelerated also by the addition of various substances as described in my aforementioned U. S. Patent No. 2,020,775.

*Example 2.*—Di-(nitrobenzoylamino)-stilbene-disulphonic acid is incorporated into a photographic layer. This may be done either by bathing the layer, or already during the production of the light-sensitive emulsion. The layer is exposed, developed and fixed in the usual manner and the metal deposit image is treated with a solution of

| | Grams |
|---|---|
| Water | 100 |
| Thiocarbamide | 7 |
| Sulphuric acid | 1 |
| Hydroquinone | 6 | for about 10 minutes. The layer is washed and immersed for about 5 minutes in an acid solution containing ½% of nitrous acid, washed again and treated with a solution containing 1% β-naphthol and ½% sodium hydroxide. A red dyestuff image is obtained at the places of the original metal deposit. If metallic silver is still present at the places where the red dyestuff has been formed, a 5% cupric chloride solution may be applied followed by a fixing bath to remove the silver.

Instead of the dye-destroying solutions described in my aforementioned U. S. Patent No. 2,020,775 the treating baths described in my co-pending application Serial No. 179,591, filed Dec. 13, 1937, may be used.

*Example 3.*—p-Nitrobenzoyl-primuline-sulphonic acid is incorporated into a photographic layer by bathing or by adding about ½ to 1 gram of the nitro-compound to the emulsion used for coating 1 square meter. The layer thus obtained is exposed and the latent image thereby obtained is developed and fixed in the usual manner. The layer containing the nitro-compound is treated with a 2% alkaline sodium hydro-sulphite solution whereby the nitro-compound is transformed into the corresponding amino-compound. After washing the layer the amino-compound is diazotised by treating with a sodium nitrite solution and the diazo-compound is coupled with an alkaline R-salt in the known manner. A silver picture in a diffusely dyed layer is thereby obtained and the layer is treated with a 1% aqueous solution of hydrochloric acid containing 0.002% of 2,3-diamino-phenazine. By this treatment the dyestuff is destroyed at the places where silver is present and a reversed red dyestuff image is obtained. If necessary, a cupric chloride solution may be applied followed by a fixing bath to remove any residual silver.

*Example 4.*—A photographic layer containing nitro-benzoyl-primuline-sulphonic acid and a silver image produced in the same manner as described in Example 3 is treated with a bath containing Potassium bromide _____ grams __ 74
Sulphuric acid (d=1.84) _____ cc___ 17.5 per liter and saturated with 2,3-diphenyl-quinoxaline. Thereby, the nitro-compound is reduced at the places where silver is present to the corresponding amino-compound. Then the amino-compound thus produced is diazotized and coupled with an alkaline H-acid solution, yielding a violet dyestuff image corresponding to the silver image. The layer is then treated with a cupric chloride solution and fixed to remove any residual silver.

Instead of reducing the nitro-compound locally in situ with the silver, the reduction may also be effected at the places where no silver is present. If, for example, the photographic layer is hardened at the exposed parts, a reducing agent will only reduce the nitro-compound at the unhardened points. Or, if the silver image is transformed into an oxidizing substance, a reducing agent will only attack the nitro-compound at the places where no oxidizing silver-compound is present.

The nitro- or nitroso-compounds described in the examples may be replaced by other nitro- or nitroso-compounds such as, for instance, di-(p-nitrobenzoylamino)-diphenylurea, nitro-benzoyl-H-acid, nitro-benzoyl-benzidine-disulphonic acid or 1-nitro-4-naphthalene-sulphonic acid. Instead of the coupling compounds described any other suitable coupling compounds may be used. It will be found to be preferable to select from the great number of suitable nitro-compounds or nitroso-compounds those bodies which are only difficultly removed from the emulsion by treatment with the ordinary photographic baths, or those which are insoluble as, for instance, the p-stearoyl-amino-nitrobenzene. If nitro-compounds are used which yield amino-compound of high solubility in acids the reduction of the nitro-compound will be carried out in a neutral or even in an alkaline solution. The unreduced nitro-compound may, if desired, be removed from the layer by a solvent or in the case of a difficultly soluble compound this may be split up to form a body of greater solubility. The nitro-compound may be intensely colored or even practically colorless.

According to the present invention photographic multi-color images may be produced by incorporating into the various layers of a multi-layer material different nitro-compounds which are reduced to form different amino-compounds from which dyestuffs of different shades are produced. For this purpose the amino-compounds may be diazotised and coupled with the same coupling component in all of the layers or with different coupling components in the various layers. Instead of producing all of the dyestuff images of a multi-color image in accordance with the present invention the process described may be used to form a dyestuff image in one of the layers of a multilayer material, in the other layers of which dyestuff images are produced by another process such as, for example, by the process of color development or by the transformation of a leucodyestuff or a derivative of leucodyestuffs into a dyestuff image or by the local destruction of an image forming dyestuff. In carrying out the process of the present invention a new material is used comprising an aromatic nitro- or nitroso-compound within a photographic silver halide emulsion layer and especially within one of the silver halide emulsion layers of a multi-layer light-sensitive material and the process depends on the reduction of such nitro-compounds to amino-compounds within the photographic layer, the amino-compounds thus formed being used in the production of an azo-dyestuff image.

What is claimed is:

1. The process of dyeing a photographic image by an azo-dye which comprises incorporating in the light sensitive silver halide emulsion layer used for the production of the image an organic nitrogen compound selected from the group which consists of aromatic nitro-compounds and aromatic nitroso compounds, exposing the layer to light to form a latent image therein, developing the layer to form a metallic silver image, reducing the nitrogen compound within the layer to an aromatic amino-compound and synthesizing an azo-dye within the layer from said amino-compound.

2. The process of dyeing a photographic image by an azo-dye which comprises incorporating in the light sensitive silver halide emulsion layer used for the production of the image an organic nitrogen compound selected from the group which consists of aromatic nitro-compounds and aromatic nitroso compounds, exposing the layer to light to form a latent image therein, developing the layer to form a metallic silver image treating the layer with a reducing agent which acts on the nitrogen compound to reduce it to an amino-compound within the whole layer without the intermediary of the silver image, synthesizing an azo-dye within the layer from said amino-compound and destroying the azo-dye locally by a dye destroying agent capable of destroying an azo-dye with the intermediary of a metallic silver image.

3. The process of dyeing a photographic image by an azo-dye which comprises incorporating in the light sensitive silver halide emulsion layer used for the production of the image an organic nitrogen compound selected from the group which consists of aromatic nitro-compounds and aromatic nitroso compounds, exposing the layer to light to form a latent image therein, developing the layer to form a metallic silver image, treating the layer with a solution which acts as a reducing agent with the intermediary of the metallic silver image to form an amino-compound from said nitrogen compound and synthesizing an azo-dye within the layer from said amino-compound.

4. The process of dyeing a photographic image by an azo-dye which comprises incorporating in the light sensitive silver halide emulsion layer used for the production of the image an organic nitrogen compound selected from the group which consists of aromatic nitro-compounds and aromatic nitroso compounds, exposing the layer to light to form a latent image therein, developing the layer to form a metallic silver image, treating the layer with a hardening agent which acts to harden the layer to a different degree at the exposed and the unexposed points, treating the layer with a reducing agent which acts to reduce the nitrogen compound to an aromatic amino-compound at the unhardened points and synthesizing an azo-dye within the layer from said amino-compound.

5. The process of dyeing a photographic image by an azo-dye which comprises incorporating in the light sensitive silver halide emulsion layer used for the production of the image an organic nitrogen compound selected from the group which consists of aromatic nitro-compound and aromatic nitroso compounds, exposing the layer to light to form a latent image therein, developing the layer to form a metallic silver image, reducing the nitrogen compound within the layer to an aromatic amino-compound and synthesizing an azo-dye within the layer from said amino-compound by treating the amino-compound with a solution of nitrous acid and by treating thereafter with the solution of an azo-coupler.

6. The process of dyeing a photographic image by an azo-dye which comprises incorporating in the light sensitive silver halide emulsion layer used for the production of the image an organic nitrogen compound selected from the group which consists of aromatic nitro-compounds and aromatic nitroso compounds, exposing the layer to light to form a latent image therein, developing the layer to form a metallic silver image, treating the layer with a reducing agent which acts on the nitrogen compound to reduce it to an amino-compound within the whole layer without the intermediary of the silver image, synthesizing an azo-dye within the layer from said amino-compound by treating the amino-compound with a solution of nitrous acid and by treating thereafter with the solution of an azo-coupler and destroying the azo-dye locally by a dye destroying agent capable of destroying an azo-dye with the intermediary of a metallic silver image.

7. The process of dyeing a photographic image by an azo-dye which comprises incorporating in the light sensitive silver halide emulsion layer used for the production of the image an organic nitrogen compound selected from the group which consists of aromatic nitro-compounds and aromatic nitroso compounds, exposing the layer to light to form a latent image therein, developing the layer to form a metallic silver image, treating the layer with a solution which acts as a reducing agent with the intermediary of the metallic silver image to form an amino-compound from said nitrogen compound and synthesizing an azo-dye within the layer from said amino-compound, by treating the amino-compound with a solution of nitrous acid and by treating thereafter with the solution of an azo-coupler.

8. The process of dyeing a photographic image by an azo-dye which comprises incorporating in the light sensitive silver halide emulsion layer used for the production of the image an organic nitrogen compound selected from the group which consists of aromatic nitro-compounds and aromatic nitroso compounds, exposing the layer to light to form a latent image therein, developing the layer to form a metallic silver image, treating the layer with a hardening agent which acts to harden the layer to a different degree at the exposed and the unexposed points, treating the layer with a reducing agent which acts to reduce the nitrogen compound to an aromatic amino-compound at the unhardened points and synthesizing an azo-dye within the layer from said amino-compound by treating the amino-compound with a solution of nitrous acid and by treating thereafter with the solution of an azo-coupler.

BELA GASPAR.